United States Patent [19]

Pellenc

[11] 4,359,821
[45] Nov. 23, 1982

[54] HYDRAULIC SECATEUR OR PRUNING SHEARS HAVING A DEVICE FOR CONTINUOUSLY CONTROLLING THE SEPARATION OF ITS CUTTING BLADES

[75] Inventor: Roger J. P. Pellenc, Pertuis, France

[73] Assignee: Etablissements Pellenc & Motte, Pertuis, France

[21] Appl. No.: 204,795

[22] Filed: Nov. 6, 1980

[30] Foreign Application Priority Data

Nov. 13, 1979 [FR] France ................. 79 28269

[51] Int. Cl.³ ............................................. B26B 15/00
[52] U.S. Cl. ........................................ 30/228; 30/249
[58] Field of Search ...................... 30/249, 228, 180

[56] References Cited

U.S. PATENT DOCUMENTS 2,714,250 8/1955 Twedt ................. 30/249 X
4,109,381 8/1978 Pellenc .
4,206,603 6/1980 Mekler ................. 30/180 X

FOREIGN PATENT DOCUMENTS

7222947 1/1974 France .

Primary Examiner—Frank T. Yost
Attorney, Agent, or Firm—Sandler & Greenblum

[57] ABSTRACT

A hydraulic secateur or pruning shears includes a device for continuously and smoothly controlling the separation of its cutting blades. This avoids the disadvantage inherent in conventional hydraulic-assisted pruning shears, in which the cutting blades must either be open completely or closed completely, resulting in the entanglement of branches and other undesirable objects with the cutting blades. The controlling device includes a trigger, distribution apparatus for pressurized fluid, an inlet for the fluid and an outlet for the fluid. At least one of the blades is pivotable and activated by hydraulic apparatus. The blades can be set and maintained at any position between the two extreme positions.

13 Claims, 8 Drawing Figures

HYDRAULIC SECATEUR OR PRUNING SHEARS HAVING A DEVICE FOR CONTINUOUSLY CONTROLLING THE SEPARATION OF ITS CUTTING BLADES

BACKGROUND OF THE INVENTION

1. Field of the Invention

The present invention generally relates to hydraulic pruning shears or secateurs having a contained controlling device and more specifically to such apparatus as particularly used for cutting or harvesting in arboriculture, viticulture and horticulture.

2. Description of Prior Art

Hydraulic secateurs or pruning/cutting shears are known which comprise a blade or hook rigidly attached to and integral with the front portion of a body serving as a handle, a pivotable blade journalled on the hook and connected, by means of a connecting rod, to the shaft of a piston moving in sliding and sealed fashion within a bore of the body, and a hydraulic distributor generally activated by a lever or trigger and adapted to control the movements of the piston to assure the closing and opening of the blade.

According to the known embodiments of hydraulic pruning shears or secateurs of this type, it is not possible to synchronize the speed and amplitude of the pivoting movements of the mobile blade with the speed and amplitude of the trigger's movements; accordingly, the activation or release of the trigger unavoidably causes the substantially complete closing or opening of the blade, in sudden fashion, depending upon the power of the tool. This constitutes a source of danger, because it is practically impossible to stop the flapping of the mobile blade in the direction of the fixed blade when the hydraulic distributor has been activated. This is also a notable disadvantage, because it is often desirable to reduce the spacing of the blade for penetrating into relatively dense vegetation, so as to limit the chance that the device will get caught upon other objects in its path.

SUMMARY OF THE INVENTION

It is, therefore, an object of the present invention to overcome the above disadvantages. According to the object of the invention, it is possible, in effect, to coordinate the speed and amplitude of the blade's pivoting motion to coincide with the speed and amplitude of the movements of the trigger. Consequently, it is possible to immobilize the blade in an intermediate position which is located between the maximum opening and closing positions, irrespective of the trigger's direction of movement.

The hydraulic shears according to the present inventions are particularly unique in that they comprise a piston with a shaft connected to the mobile blade, as well as two opposite work faces defining two chambers. A first chamber is positioned in constant relation with the inlet for hydraulic fluid under pressure, and a second chamber is adapted to be placed in communication with the return or with the first chamber. The shears also include a hydraulic distributor which comprises a distributor drawer positioned and adapted to slide axially within the assembly. A piston shaft of the piston is connected to a manual control element and distribution means make it possible, as a function of the position of the drawer, to either place the second chamber into communication with the return chamber in a manner so as to cause the piston to advance, or to close the second chamber in a fashion so as to assure the immobilization of the piston in an intermediate position, or to place the first and second chambers in constant communication with the inlet so as to cause the retreat thereof in the opposite direction.

An advantage obtained by virtue of the present invention is that the secateur benefits from a complete range of control permitting the trigger to directly modulate the speed of closing of the blades and the maintenance of the blades open in the intermediate positions between their maximum opening and closing positions. An apparatus results which benefits from the advantages and power of hydraulic shears while acting in the same easily controllable manner as conventional manual secateurs.

The above features, advantages and objects of the present invention are attained in one aspect thereof by a hydraulic-assisted secateur or cutting shears which are adapted for cutting or harvesting in arboriculture, viticulture and horticulture. The shears comprise a body having a front end and a rear end and two blades attached adjacent the front end thereof. At least one of the blades is a movable and pivoting blade which is activated by a hydraulic device. The secateur further includes means for continuously adjusting the position of the blades at any predetermined position within a range of positions bound by a completely open position of said blades and a completely closed position of said blades.

The present device is adapted to continuously maintain the spacing of the cutting blades of the secateur in controlled fashion. Specifically, while the prior art devices required that the blades either be completely open or closed, the present device allows for control of the blades at predetermined spaced positions between the two extreme positions.

BRIEF DESCRIPTION OF THE DRAWINGS

The above aims, advantages and characteristics of the present invention will become clear from the description which follows, by way of reference to the annexed drawings in which.

DESCRIPTION OF PREFERRED EMBODIMENTS

As seen in the annexed drawings, given by way of non-limiting example, the pruning/cutting shears or secateur comprises a hollow body 1 serving as a handle and having on its anterior or head portion, fixed in known fashion, the fixed or stationary hook or blade 2 of the apparatus. On this hook, mobile blade 4 is journalled by means of a spindle 3. The mobile blade comprises an extension or lever 4a journalled at one of the ends of a pair of connecting rods 5 whose other end is journalled in a clevis 6. This clevis is rigidly attached, e.g., by a screw, on the front end of shaft 7 of drive piston 8, which is preferably formed of a single piece with the clevis and positioned in a manner such that it can sealably slide within the opening or bore of body 1 and, more precisely, in a bore 1a formed in the front half portion of the body.

This piston comprises two opposite work faces having, according to a preferred embodiment, unequal surfaces, such as a large front face f1 and a small rear face f2.

The principal piston 8 is rigidly integral, by means of an intermediate spacing shaft 9 having a bore therethrough positioned opposite drive shaft 7, with a secondary piston 10 having at least one peripheral joint and which is adapted so as to slide in a sealable fashion within bore 1b formed in the rear half portion of the opening of the body, along the extension of bore 1a and having a diameter less than that of bore 1a. The assembly 7, 8, 9 and 10 is preferably formed from a single piece of material.

The face f3 of the secondary piston 10 has, facing face f2 of the principal piston 8, has a smaller surface than that of the face f2. The pistons 8 and 10 define an annular chamber A surrounding intermediate shaft 9.

The shaft 7 of piston 8 slides, in a sealed manner, within a guide 11 comprising at least one fixed ring, preferably a disassemblable ring, e.g., by means of a metallic strip, within the front portion of the opening of body 1. This metallic strip guide is provided with at least one peripheral sealing joint.

The internal face of guide 11 and the front face f1 of piston 8 define an annular chamber B surrounding shaft 7.

A distributor drawer 12 is mounted, and adapted to axially slide within the assembly of shaft 7, piston 8, and intermediate shaft 9. The rear end of this drawer is subjected to the action of a compression spring 13. This compression spring is, e.g., wedged, at one end against a first ring or annular element 14 installed on the periphery of the rear end of the drawer and, at a second end, against a second ring 15 mounted adjacent the rear end of the bore of the intermediate shaft 9 and secondary piston 10 assembly. The spring 13 thus is permanently biased to push drawer 12 toward the front of the assembly 7, 8, 9 and 10.

The front end of drawer 12 is connected to the bent and 16a of a maneuvering shaft 16 which is positioned so that it has a sliding clearance within a longitudinal bore 1c provided in body 1 beneath bore 1a.

Figures 2, 3:
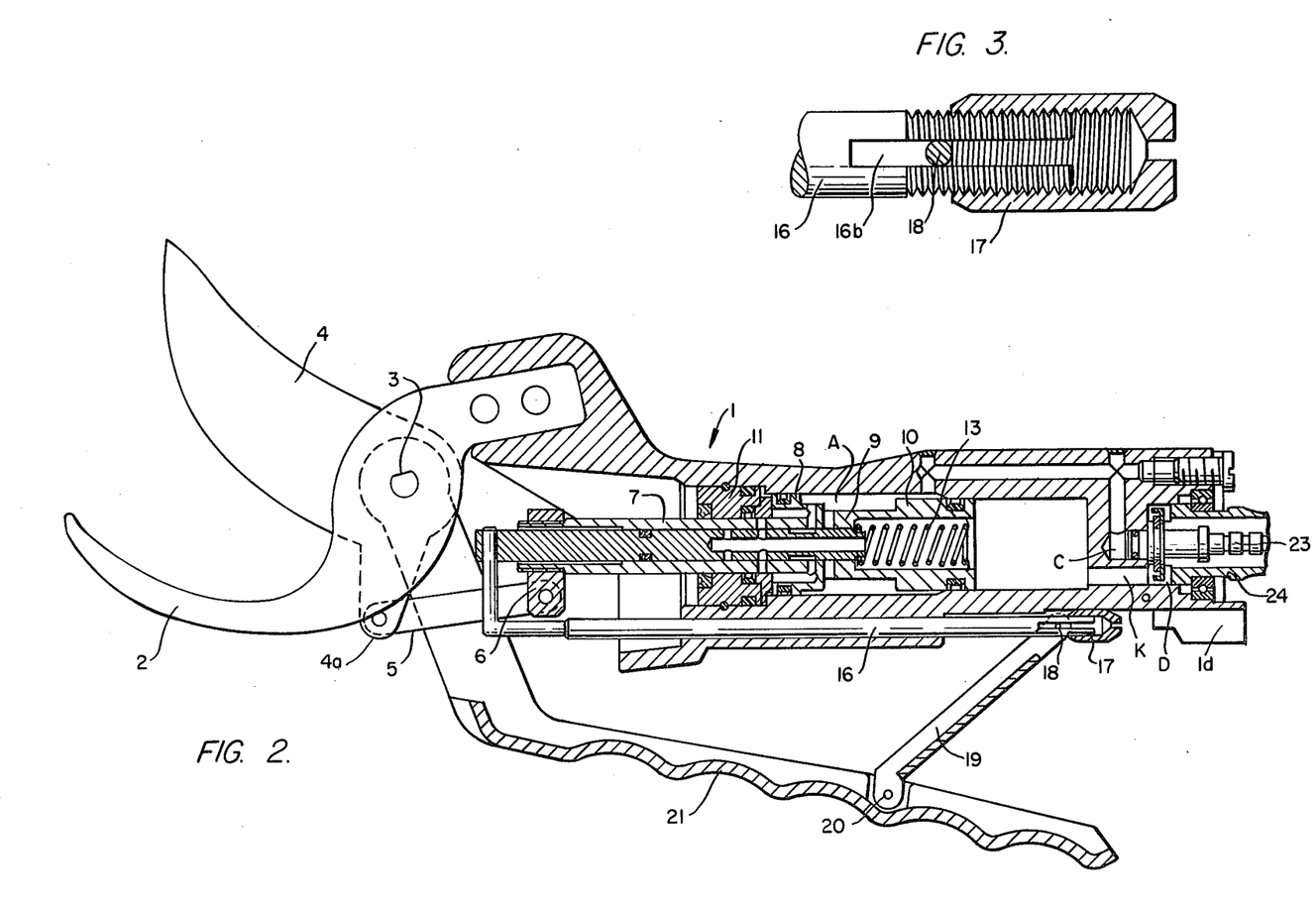
FIG. 2 is an axial cross-sectional view which is comparable to FIG. 1 and which shows the secateur with its blades in their open position.
FIG. 3 is an enlarged sectional view of the adjustment means of the journal axis of the maneuvering rod connected to the trigger along the rear end of the drive shaft of the distribution drawer.

The rear end of the shaft is threaded and comprises a slot 16b. On the threaded end a nut 17 having a quadrangular cross-section and provided with an adjustment head (see FIG. 3) is threadably screwed thereon.

This nut is immobilized against rotation by two protrusions 1d, extending from the rear portion of body 1 within bore extension 1c, and between which it can axially slide.

This nut makes it possible to adjust the position, with respect to the shaft 16, of journal axis 18 extending through slot 16b, and of one of the ends of a manuvering connecting rod 19 which is also journalled, at its opposite end, by a spindle 20, on the rear portion of a control lever or trigger 21. This control lever or trigger 21 is also journalled, at its front end, on spindle 3.

The journalling of trigger 21 on spindle 3 of the mobile blade and its orientation from the front towards the rear of the secateur results in better gripping by a user, in view of the user's habits in handling manual conventional secateurs. Furthermore, with such an arrangement, the branches and similar materials do not have a tendency, in the course of being worked, to become lodged between the trigger and secateur body 1 so as to interfere with or prevent the cutting. A security ring 22 journalled on the rear portion of body 1 makes it possible to maintain trigger 21 in its closed position when not in use.

Along the rear portion of body 1 a housing is provided for the disassemblable connection of the secateur to the coupling device of flexible coaxial feed line 23 and return line 24, one of which brings the pressurized hydraulic fluid from a hydraulic fluid source (e.g., a pump, tractor hydraulic circuit, automotive or other platform vehicles, or hydraulic group adaptable to motorized cultivators), while the other line assures the return of the fluid back to the pressurized source. The preferred coupling device used is the one disclosed in United States Patent Application Ser. No. 018,038, now U.S. Pat. No. 4,323,269.

The housing provided in the rear portion of the body for the connection of the coupling device comprises two coaxial cylindrical chambers. A first chamber C of a reduced diameter is adapted for the sealed insertion of the interior connection integral with the end of the flexible internal feed line 23 and a chamber D of a greater diameter positioned about the other chamber and permitting the sealed engagement of the exterior connection secured to the end of the flexible exterior return line 24.

A channel E is provided in the body 1 so as to establish constant communication between the inlet chamber C for the pressurized hydraulic fluid and the chamber A defined by the pistons 8 and 10.

Figure 5:
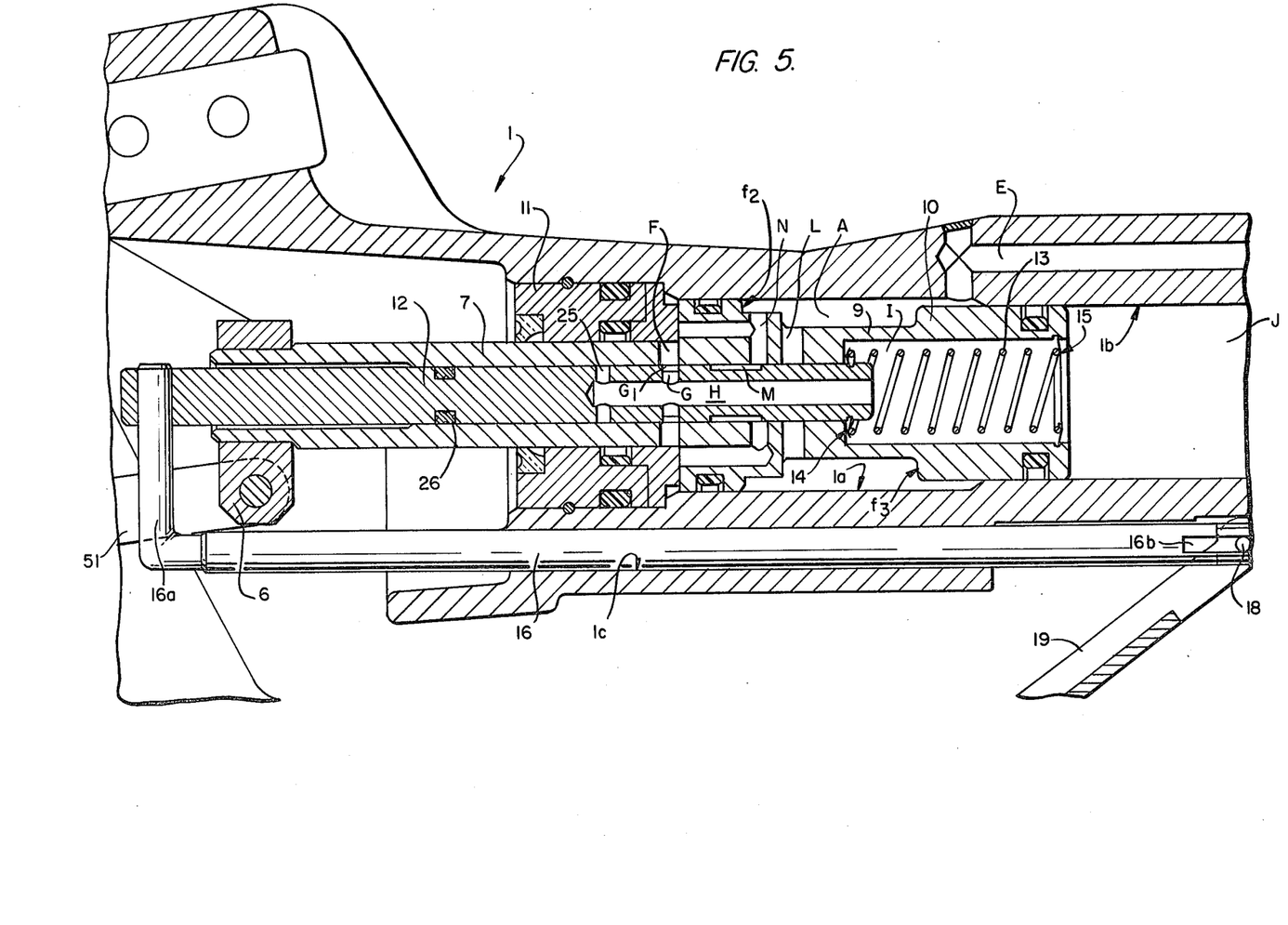
FIG. 5 is a partial view, on a magnified scale, of the device shown in FIG. 2.
Figure 6:
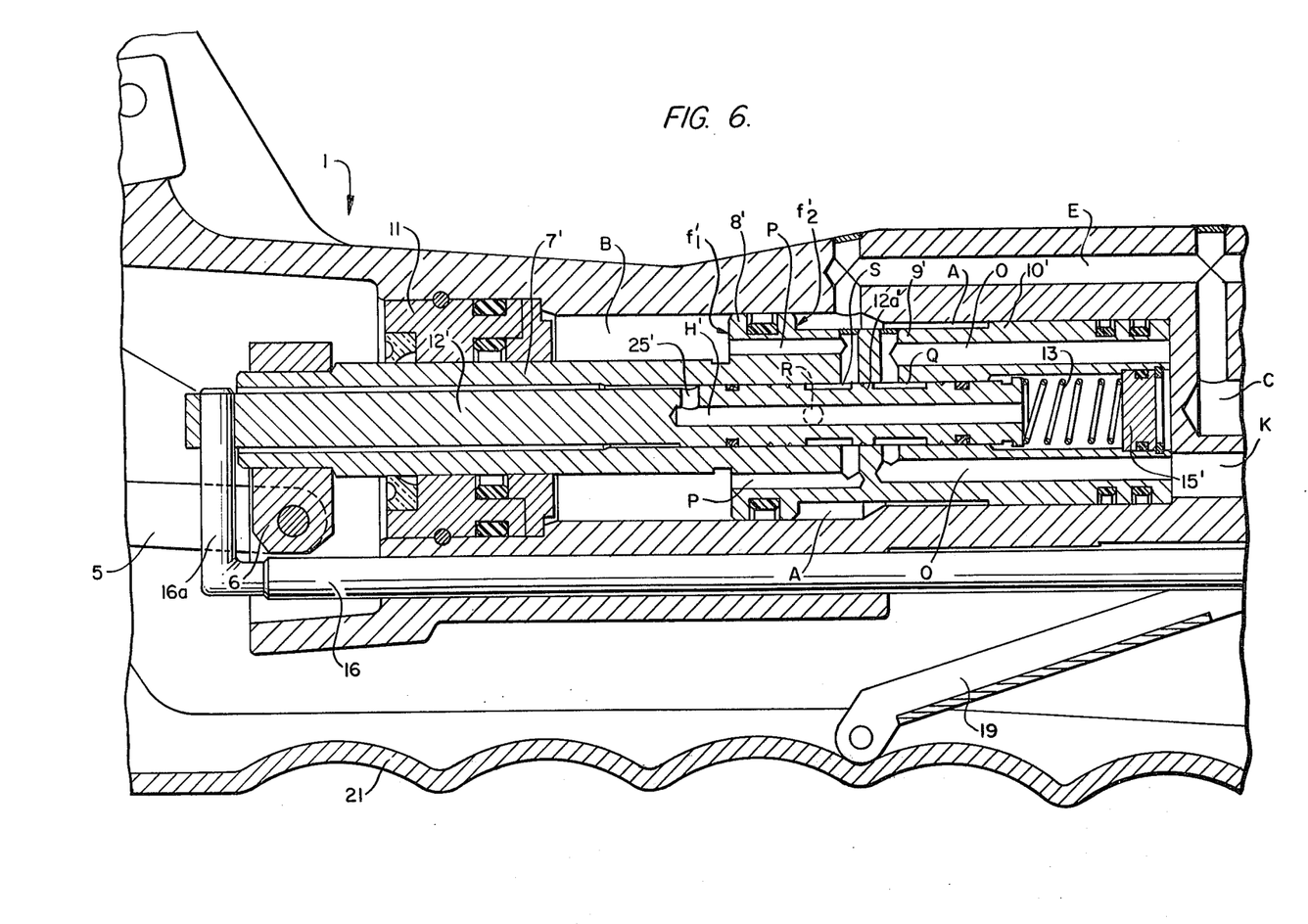
FIG. 6 is a partial view, in axial cross-section, of an alternative embodiment of the activation device of the mobile blades.

The chamber B defined by the guide 11 and the piston 8 can be placed in communication, by the proper positioning of the drawer 12, with chamber B communicating with the flexible return line by means of a passage comprising:

(a) One or more orifices and, for example, two radial orifices F provided in the shaft 7, in front of the piston 8;
(b) One or more holes and, for example, two radial holes G provided in the end of an annular throat G1 provided by the distributor drawer 12;
(c) A longitudinal conduit H constituted by a bore in the rear portion of the drawer and in which the openings G open into;
(d) The bore I of the intermediate shaft 9 and piston 10 assembly in which the conduit H opens into;
(e) The chamber J defined by the rear face of the piston 10; and
(f) A channel K bored in the rear portion of the body 1. This pathway is best illustrated in FIGS. 5 and 6.

On the other hand, communication can be established between the chambers A and B, by the appropriate positioning of the drawer, by means of a passage comprising:

(a) One or more orifices and, for example, two radial orifices L provided in the intermediate shaft 9, behind the piston 8;

(b) An annular throat M provided by the distribution drawer 12, at the rear and at a small distance from the throat G1; and (c) One or more channels and, for example, two channels N bored in the piston 8 in diametrically opposed fashion and which open, on one hand, to the front of the piston, in the chamber B, and, on the other hand, in the bore of the piston.

One or more transverse bores 25 are provided at the end of an annular throat with which drawer 12 is provided, at the front of the throat G1, and an opening near the end of the bore H allows for efficient draining, towards the return line, of the oil which can drip or leak from chamber B and escape in the direction of the front of the apparatus. To improve sealing, a joint 26 is inserted in the annular throat of the drawer located in its front portion, ahead of bore or bores 25.

Figure 1:
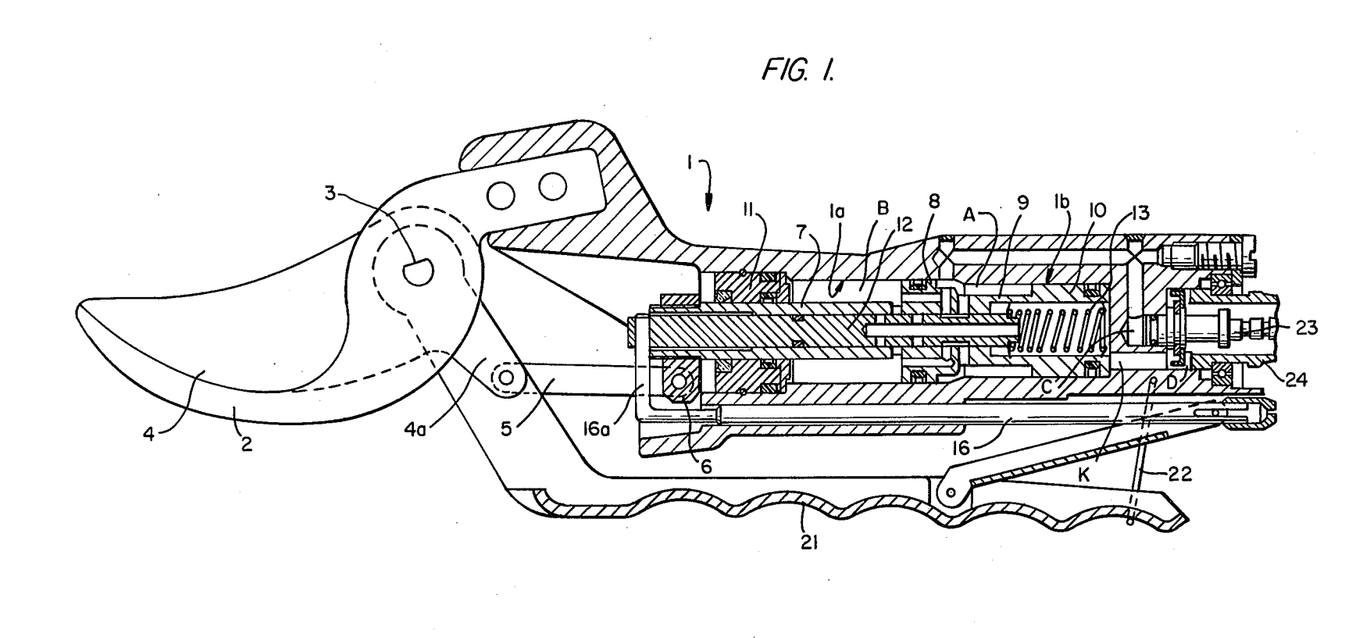
FIG. 1 is an axial cross-sectional view of a hydraulic secateur or shears according to the invention, with its blades in a closed position.
Figure 4:
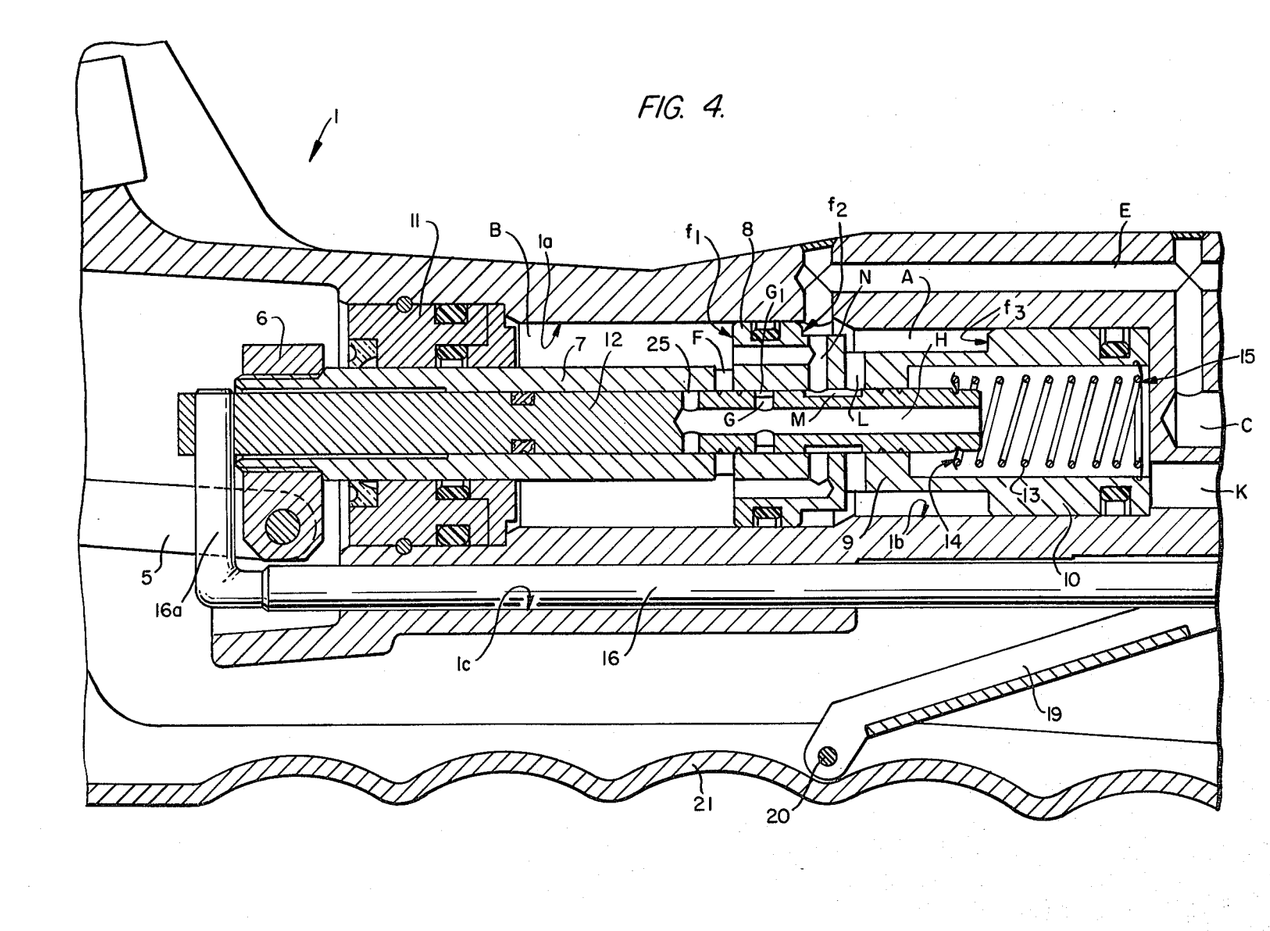
FIG. 4 is a partial view, on a magnified scale, of the device shown in FIG. 1.

The secateur which has been described operates as follows:

When the blades are closed (FIGS. 1 and 4), the pistons 8 and 10 are wedged at the end of their retreating path of movement and pressurized oil fills the chambers A and B communicating through the passage consisting of orifices L, throat M, and channels N, while escape orifices F are blocked by the drawer 12.

When the lever or trigger 21 is released, the spring 13 pushes the drawer 12 towards the front. The advance of the drawer first causes the closing of the orifices L, then the placement in communication of the escape orifices F with the diametrical hole G such that the oil contained in the chamber B can be brought to the flexible return line through the passage comprising F, G, H, I, J, K and D. The absence of pressure in chamber B makes it possible to advance the pistons 8 and 10 under the effect of the pressure present in the chamber A, taking into account the work surface f2 of the piston 8 and more significantly the work surface f3 of the piston 10. When the piston 8 sliding on the drawer goes to block the inlet throat G1 of the hole G, it stops because the oil contained in the chamber B can no longer escape. The drawer again advances under the pressure of the spring, again placing the orifices F and the holes G in communication, which again causes the advancement of the piston. This continues until the blades have completely opened if no retentive action is exerted on the trigger 21. It will be thus understood that the release of the trigger results, thoughout its course of pivoting, in slight advances of the drawer 12 with respect to the shaft 7, piston 8, intermediate shaft 9 and piston 10 assembly, which advances are instantaneously followed by small advances of the assembly, such that the opening of the blades is completely controlled by the trigger. The repeated movements are on the order of several tenths of a millimeter, and are achieved in a very short time, such that the opening of the blades practically occurs in a smooth, progressive and continuous manner without discontinuities.

It will be understood that it is also possible to immobilize the mobile blade in any intermediate position between the maximum opening and closing positions. To accomplish this it is necessary only to stop the pivoting of the trigger in a manner such that the piston 8 comes to block the inlet gorge or throat G1 of the holes G, the drawer being placed into the immobilized position by the maintenance of the trigger, and the piston not being able to advance as a result of the absence of communication between the escape orifices F and the holes G. The closing of the blades, resulting in a cutting action, operates in an analogous fashion.

In the position of complete blade opening (FIGS. 2 and 5), the pistons 8 and 10 are positioned at the end of their front extent of movement, the chamber B communicates with the return line or chamber through the passage F, G, H, I, J, K, and D while the drawer blocks the orifices L of the passage L, M, N of communication between the chamber B and the chamber A under pressure, which is thus closed.

When trigger 21 is pressed, the retreat of the drawer 12 is caused by means of the connecting rod 19 and of the maneuvering shaft 16. The drawer slides within the assembly 7, 8, and 9 and, at first, it closes the escape orifices F such that the chamber B is no longer in communication with the return line. By continuing in this fashion, the drawer opens the orifices L by placing them in communication with the throat M, which establishes communication between the chambers A and B through the passage L, M, N.

The pressurization of the chamber B causes the retreat of the assembly 7, 8, 9 and 10, by virtue of the fact that the surface f1 of the piston 8 is greater than the opposite surface f2, this difference in surface area being amplified by the surface f3 of the piston 10. While retreating, the assembly 7, 8, 9 and 10 slides over the drawer, ending the communication between the orifices L and the annular throat M, such that the chamber B is no longer under pressure and the said assembly stops. Continuation of the closing movement of the trigger reestablishes the communication between the orifices L and the throat M. This again causes the retreat of the assembly 7, 8, 9 and 10, until the complete closing of the blades if pressure is maintained on said trigger; this will continue until the trigger reaches the end of its extent of closing.

It will be understood, as a result, that the pivoting of the trigger 21 results, throughout the course of its closing, by slight retreating movements of the drawer 12 with respect to the shaft 7, piston 8, intermediate shaft 9 and piston 10 assembly, which are instantaneously followed by slight retreating movements of the assembly, such that the closing of the blades is totally subjected to and follows that of the trigger.

As indicated previously, the closing of the blades occurs without discontinuities by virtue of the low amplitude of the alternating and repeated movements of the drawer 12 and of the assembly 7, 8, 9 and 10 and by virtue of the very short time in which all of these actions occur.

It should be likewise understood that it is possible to immobilize the mobile blade in any intermediate position between the maximum opening and closing positions. To do this it is necessary only, in effect, to no longer exert pressure on the trigger in a fashion such that the drawer 12 is maintained in a stationary state, the retreat of the assembly 7, 8, 9 and 10 terminating as soon as the communication between the orifices L and the annular throat M stops, i.e., between the chambers A and B.

Figure 7:
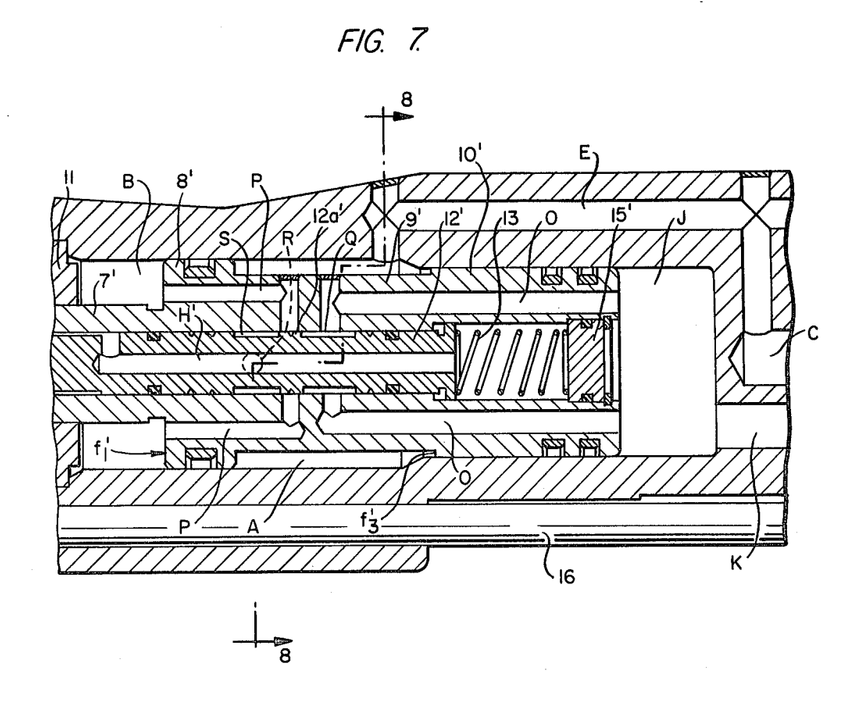
FIG. 7 is a partial view comparable to FIG. 6, illustrating the hydraulic device when activating the blades, in a position corresponding to the immobilization of the mobile blades in an intermediate position between the maximum or extreme open and closed positions.
Figure 8:
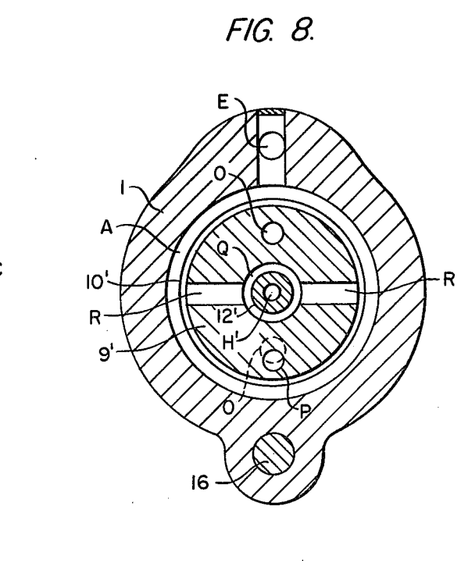
FIG. 8 is a transverse cross-sectional view taken along line 8—8 of FIG. 7.

The alternative embodiment, as illustrated in FIGS. 6–8, differs in that fluid flow does not occur through the bore H′ of the drawer 12′, but through escape channels O provided in the rear portion of the intermediate shaft 9′ and in the secondary piston 10′. The escape channels open, in one situation, into a bore in the intermediate shaft and, on the other hand, to the rear of the secondary piston. According to this embodiment, the chamber B defined by the guide 11 and the piston 8′ can be placed in communication with the chamber D, communicating with the flexible return line by means of at least one passage which comprises:

(a) One or more channels and, for example, two communication channels P bored in the piston 8′ and in the intermediate shaft 9′ in a diametrically opposed manner, the said channels opening to the interior of the intermediate shaft, at the rear of the plane in which is comprised the face f2′ of the said piston;

(b) An annular throat Q comprising part of the distribution drawer 12′;

(c) The escape channels O whose inlets are positioned at a small distance from and rearwardly of those of the channels P;

(d) The chamber J defined by the rear face of the piston 10′; and (e) The channel K bored in the rear portion of the body 1.

On the other hand, communication can be established between the chambers A and B, through a passage comprising:

(a) One or more bores and, for example, two radial bores R provided in the intermediate shaft 9′, at the rear of the piston 8′, and in front of the inlet of the communication channels P;

(b) An annular throat S comprised by part of the drawer 12′ in front of the throat Q and at a small distance therefrom; and (c) The channels P opening at the rear and at a small distance from the bores R.

The circular shoulder 12a′ separating the throats Q and S can come to block the channels P in a manner such that there is no communication:

(a) On the one hand, between the chambers A and B, or (b) On the other hand, between the chamber B and the return line.

The thickness of the shoulder 12a′ of the drawer 12′ is approximately equal to:

(a) On one hand, the distance separating the orifices of the bores R and of the channels P opening into the bore of the assembly comprising elements 7′, 8′, 9′ and 10′; and (b) On the other hand, the distance separating the orifices of the channels P and O opening into the said bore of the assembly.

Furthermore, according to this embodiment, the rear end of the spring 13 is not wedged against a ring, but against a cap 15′ screwed into the rear portion of the piston 10′ and which blocks the bore I in which the spring is positioned.

The operation of the secateur fitted according to this embodiment of the hydraulic activating device is substantially the same as that of the one described above.

In the closed position of the blades (FIG. 6), the pistons 8′ and 10′ are wedged at the end of their retreating extent and the pressurized oil fills the chambers A and B, which are in communication through the passage R, S and P, while the shoulder 12a′ opposes the circulation of the oil in the direction of the escape channels O.

When one releases the trigger 21, the spring 13 pushes the drawer 12′ towards the front, which initially causes the closing of the channels P by the shoulders 12a′, then, their recovery and placement into communication with throat Q, such that the oil contained in the chamber B can be brought to the flexible return line through the passage P, Q, O, J, K and D. The absence of pressure in the chamber B makes it possible to advance the shaft 7′, piston 8′, intermediate shaft 9′ and piston 10′ assembly, under the effect of pressure present in the chamber A, by virtue of the fact that, as indicated previously, the work surface f2′ of the piston 8′ is greater than the work surface f3′ of the piston 10′. When, as a result of the sliding of the assembly 7′, 8′, 9′ and 10′ on the drawer, the inlets of channels P are blocked by the shoulders 12a′, the assembly stops, because the oil contained in the chamber B cannot be evacuated towards the return line. The drawer advances again under the pressure of the spring, again placing channels P and throat Q into communication, which makes it possible to again advance the assembly comprising elements 7′, 8′, 9′ and 10′; this continues until the complete opening of the blades if no retention action is exerted against the opening of the trigger 21.

The stopping of the movable blade in any intermediate position between the closing and the opening (FIG. 7) is obtained by retaining the trigger in a fashion so as to immobilize the drawer 12′. In this instance, the assembly comprising elements 7′, 8′, 9′ and 10′ stops as soon as the inlets of channels P are blocked by the shoulders 12a′ of the drawer maintained in the stationary state, chamber B no longer being under pressure, but the oil enclosed in this chamber is no longer able to escape towards the return, thereby stopping all movement towards the front of the assembly.

The closing of the blades operates in an analogous fashion.

In the completely open position of the blades, the pistons 8′ and 10′ are wedged at the end of their front extent, the chamber B communicating with the return line through the passage P, Q, O, J, K and D, while the shoulders 12a′ of the drawer 12′ positioned between the bores R and the channels P forbid any communication between the chamber and the pressurized chamber A.

When pressure is exerted on the trigger 21, retreat of the drawer 12′ is caused, which drawer slides within the assembly comprising elements 7′, 8′, 9′ and 10′.

At first, the shoulders 12a′ shut off communication between the channels P and O, such that the chamber B is no longer in communication with the return line. Later, the shoulders 12a′ open the channels P by putting them into communication with the throat S, which establishes communication between the chambers A and B through the passage R, S and P.

The pressurization of the chamber B causes the retreat of the assembly comprising elements 7′, 8′, 9′ and 10′, which assembly slides over the drawer 12′, taking into account the fact that the surface f1′ of the piston 8′ is greater than the opposite surface f2′, this difference in cross-section being increased by the work surface f3′ of the piston 10′.

This retreat stops when the inlets of the channels P are blocked by the shoulders 12a′.

The continuation of the closing movement of the trigger reestablishes the communication between the bores R and the channels P by means of the throat S and causes retreat of the assembly comprising elements 7′, 8′, 9′ and 10′; this continues until the complete closing of the blades if pressure is maintained on the trigger until the end of its closing movement.

The immobilization of the mobile blade in any intermediate position between the maximum opening and closing occurs by interrupting the pivoting of the trigger so as to immobilize the drawer 12'. In this instance, and as indicated above, the assembly comprising elements 7', 8', 9' and 10' stops as soon as the inlet of each channel P is blocked by a shoulder 12a' of the drawer maintained in the stationary state (FIG. 7).

It will be understood that in this embodiment, the position of the blades is likewise totally subjected to the position of the trigger or maneuvering lever 21.

According to this embodiment, the bore H' provided in the rear portion of the drawer and the end of which opens into at least one transverse bore 25', serves only for drainage of the oil.

Although the invention has been described with respect to particular means and embodiments, it is to be understood that the invention is not limited to the particulars disclosed and extends to all embodiments falling within the scope of the claims.

What is claimed is:

1. A hydraulic-assisted secateur adapted for cutting or harvesting in arboriculture, viticulture and horticulture, said secateur comprising a body having a front end, a rear end, and two cutting blades attached to said body adjacent to said front end, at least one of said blades being a pivoting blade which is adapted to be driven by a hydraulic device, a drive piston having a shaft secured to said pivoting blade, said shaft being slidable within an opening in said body and said piston comprising opposed work faces, said work faces defining a portion of enclosed first and second chambers, respectively, said first chamber being in constant fluidic communication with an inlet for pressurized hydraulic fluid which is adapted to be attached to said body, a distributor drawer, and fluidic distribution means adapted to control the movement of said piston within said body opening, said distributor drawer being slidably positioned within said piston and within said shaft and being indirectly connected to a trigger, said secateur including means for setting and maintaining said blades in a predetermined position, which position may comprise any position between an entirely open position of said blades and an entirely closed position of said blades.

2. A hydraulic-assisted secateur in accordance with claim 1 wherein said distribution means is adapted to slide into different positions, a first position in which the second of said chambers is placed into communication with a fluid return line to cause said piston to move towards said front end of said body, a second position in which said second chamber is closed and said piston is immobilized, and a third position in which said first and second chambers are placed into continuous fluidic communication with said inlet and in which said piston moves away from said front end of said body.

3. A hydraulic-assisted secateur in accordance with claim 2 wherein said distributor drawer is attached to said trigger by a connection which includes a maneuvering shaft slidably mounted within a longitudinal bore in said body and at least one connecting rod which is journalled at one end to a rear portion of said maneuvering shaft and at its other end to a rear portion of said trigger.

4. A hydraulic-assisted secateur in accordance with claim 3 wherein said connecting rod is journalled about a journal axis which is adjustable with respect to said maneuvering shaft.

5. A hydraulic-assisted secateur in accordance with claim 4 wherein said pivoting blade is pivoted about a spindle and said trigger is journalled about said spindle.

6. A hydraulic-assisted secateur in accordance with claim 5 further comprising a compression spring positioned within a bore of an intermediate shaft and secondary piston assembly, said compression spring abutting against said distributor drawer and being adapted to push said drawer towards said front end of said body.

7. A hydraulic-assisted secateur in accordance with claim 6 wherein said drive piston is rigidly and integrally connected to said secondary piston via an intermediate shaft, said secondary piston comprising a work surface which bounds a portion of said first chamber and which is in constant fluidic communication with said inlet, one of said drive piston work faces being disposed in opposed relation to said work surface of said secondary piston and defining a portin of said first chamber, said secondary piston work surface being smaller than said opposed work face of said drive piston.

8. A hydraulic-assisted secateur in accordance with claim 7 wherein said spring has a first end abutting said distributor drawer and a second end abutting a stop element integrally attached to a rear end of said secondary piston.

9. A hydraulic-assisted secateur in accordance with claim 7 wherein said spring has a first end which abuts against an element integral with said drawer and a second end which abuts against a stop element which is integrally attached to a rear end of said secondary piston.

10. A hydraulic-assisted secateur in accordance with claim 7 wherein the work surface of said drive piston which defines a portion of said second chamber is larger than the work surface of said drive piston which defines a portion of said first chamber.

11. A hydraulic-assisted secateur in accordance with claim 10 wherein said distribution means comprise:
    (a) a first passage adapted to permit the placement of said second chamber into fluidic communication with said return line, said first passage comprising at least one radial orifice in said drive piston shaft, at least one radial hole adjacent the end of a first annular throat portion in said distribution drawer, a longitudinal channel located along the rear portion of said drawer and connected to said radial hole, a bore located within said secondary piston and surrounding said conduit, a chamber partially defined by a rear face of said secondary piston, and a channel located adjacent said rear end of said body; and
    (b) a second passage adapted to permit the placement of said first and second chambers into fluidic communication which comprises at least one radial orifice adjacent said intermediate shaft and located rearwardly of said drive piston, a second annular throat portion in said distribution drawer located at a small distance from said first annular throat portion and at least one channel bored in said drive piston, said channel opening at one end at the front of said piston and at a second end into the bore of said piston.

12. A hydraulically-assisted secateur in accordance with claim 10 wherein said distribution means comprise:
    (a) a first passage adapted to permit the placement of said second chamber into fluidic communication with said return line, said first passage comprising at least one communication channel bored within said drive piston and said intermediate shaft, said channel opening at one end at the front of said piston and at the other end in the bore of said intermediate shaft, a first annular throat portion in said distribution drawer, at least one escape channel provided along the rear portion of said secondary piston, said escape channel opening at one end at a small distance rearwardly of said inlet channel and at its other end adjacent the rear of said secondary piston, a chamber at least partially defined by the rear surface of said secondary piston, and a third channel bored within the rear portion of said body; and (b) a second passage adapted to permit the placement of said first and second chambers into fluidic communication and which comprises at least one radial bore in said intermediate shaft which is located rearwardly of said drive piston and forwardly of said communication channel, a second annular throat portion forming part of said drawer, said second throat portion located forwardly of said first throat portion at a small distance therefrom, said at least one communication channel, a circular shoulder portion separating said first and second throat portions which is adapted to block said at least one communication channel when in a first position located between said first and second chambers and when in a second position between said second chamber and said return line.

13. A hydraulic-assisted secateur in accordance with claim 10 wherein said distribution drawer includes a rear portion having an axial bore and at least one radial orifice opening adjacent the end of said bore to permit oil to be drained from said drawer by dripping or leaking.

* * * * *

UNITED STATES PATENT AND TRADEMARK OFFICE
CERTIFICATE OF CORRECTION

PATENT NO. : 4,359,821

DATED : November 23, 1982

INVENTOR(S) : Roger J. P. PELLENC

It is certified that error appears in the above-identified patent and that said Letters Patent is hereby corrected as shown below:

Column 1, line 38, change "blade" to --blades--; and line 55, change "inventions" to --invention--.

Column 3, line 60, before "16a", change "and" to --end--.

Signed and Sealed this

Eighth Day of February 1983

[SEAL]

Attest:

GERALD J. MOSSINGHOFF

Attesting Officer

Commissioner of Patents and Trademarks